US011120232B2

(12) United States Patent
Doany et al.

(10) Patent No.: US 11,120,232 B2
(45) Date of Patent: Sep. 14, 2021

(54) EARLY COLLISION DETECTION AND HANDLING IN CDMA-BASED RFID SYSTEMS

(71) Applicant: Texas State University, San Marcos, TX (US)

(72) Inventors: Ramsey Doany, San Marcos, TX (US); Harold Stern, San Marcos, TX (US)

(73) Assignee: Texas State University, San Marcos, TX (US)

( * ) Notice: Subject to any disclaimer, the term of this patent is extended or adjusted under 35 U.S.C. 154(b) by 0 days.

(21) Appl. No.: 16/963,638

(22) PCT Filed: Jan. 28, 2019

(86) PCT No.: PCT/US2019/015344
§ 371 (c)(1),
(2) Date: Jul. 21, 2020

(87) PCT Pub. No.: WO2019/156835
PCT Pub. Date: Aug. 15, 2019

(65) Prior Publication Data
US 2021/0064831 A1  Mar. 4, 2021

Related U.S. Application Data

(60) Provisional application No. 62/627,850, filed on Feb. 8, 2018.

(51) Int. Cl.
*G06K 7/10* (2006.01)
*G06K 19/07* (2006.01)
(Continued)

(52) U.S. Cl.
CPC ..... *G06K 7/10039* (2013.01); *G06K 7/10108* (2013.01); *G06K 19/0723* (2013.01);
(Continued)

(58) Field of Classification Search
CPC .......... G06K 7/10039; G06K 7/10108; G06K 19/0723; G06K 17/00; G06K 7/00;
(Continued)

(56) References Cited

U.S. PATENT DOCUMENTS

| | | |
|---|---|---|
| 5,353,300 A | 10/1994 | Lee et al. |
| 8,044,773 B2 | 10/2011 | Posamentier |

(Continued)

FOREIGN PATENT DOCUMENTS

WO   2012148363 A1   11/2012

OTHER PUBLICATIONS

International Search Report for International Application No. PCT/US2019/015344 dated Apr. 24, 2019, pp. 1-3.

(Continued)

*Primary Examiner* — Brian E Miller
(74) *Attorney, Agent, or Firm* — Robert A. Voigt, Jr.; Winstead PC

(57) ABSTRACT

A method, system and computer program product for enabling early collision detection and handling in Code Division Multiple Access (CDMA)-based radio-frequency identification (RFID) systems. A tag receives an instruction from a reader to reflect either a single encoded bit or multiple encoded bits. The tag then reflects either the single encoded bit or the multiple encoded bits to the reader. The reader decodes the received encoded bit(s) from the tag, where the decoded bit(s) are placed in a vector or matrix by the reader. The vector/matrix is then transmitted to the tag, which determines if the reflected bit(s) agree with the corresponding bit(s) in the vector/matrix thereby indicating whether the reflected bit(s) were read successfully by the reader. The tag will then enter a no reflection mode in response to a disagreement between the reflected bit(s) with (Continued)

the corresponding bit(s) in the vector/matrix thereby preventing collisions from occurring.

21 Claims, 22 Drawing Sheets

(51) Int. Cl.
    *G01S 13/74*     (2006.01)
    *H04Q 5/22*     (2006.01)
    *G06F 12/00*     (2006.01)
    *G06K 17/00*     (2006.01)

(52) U.S. Cl.
    CPC .............. *G01S 13/74* (2013.01); *G06F 12/00* (2013.01); *G06K 17/00* (2013.01); *H04Q 5/22* (2013.01)

(58) Field of Classification Search
    CPC ...... G06K 7/0008; G06K 19/07; G06F 12/00; G01S 13/74; H04Q 5/22
    See application file for complete search history.

(56) References Cited

U.S. PATENT DOCUMENTS

| | | | |
|---|---|---|---|
| 8,754,749 B2 | 6/2014 | Maltseff et al. | |
| 2007/0132587 A1* | 6/2007 | Smith | G06K 19/0716 340/572.1 |
| 2007/0276985 A1 | 11/2007 | Schuessler | |
| 2008/0061935 A1* | 3/2008 | Melendez | H04B 5/02 340/10.1 |
| 2010/0214065 A1* | 8/2010 | Maltseff | G06K 19/0723 340/10.1 |
| 2010/0284495 A1* | 11/2010 | Segal | H04B 7/086 375/316 |
| 2012/0307875 A1* | 12/2012 | Maguire | H01Q 21/28 375/219 |
| 2014/0133530 A1* | 5/2014 | Maguire | H01Q 21/28 375/219 |
| 2017/0030853 A1* | 2/2017 | Hodges, Jr. | G01N 33/02 |
| 2021/0064831 A1* | 3/2021 | Doany | G06K 7/10108 |

OTHER PUBLICATIONS

Written Opinion of the International Searching Authority for International Application No. PCT/US2019/015344 dated Apr. 24, 2019, pp. 1-13.

Andreas Loeffler, "Using CDMA as Anti-Collision Method for RFID—Research & Applications," Current Trends and Challenges in RFID, Jul. 2011, pp. 1-25.

Dabas et al., "CDMA based Anti-Collision Deterministic Algorithm for RFID Tags," International Journal of Recent Trends in Engineering, vol. 1, No. 1, May 2009, pp. 1-10.

Klair et al., "A Survey and Tutorial of RFID Anti-Collision Protocols," IEEE Communications Surveys & Tutorials, vol. 12, No. 3, Third Quarter 2010, pp. 400-421.

Loeffler et al., "CDMA-Based UHF-RFID System with Semi-Passive UHF Transponders," International Journal on Advances in Telecommunications, vol. 4, No. 1 & 2, 2011, pp. 127-142.

Doany et al., "A CDMA-based RFID Inventory System," International Conference on RFID (RFID), 2016, pp. 1-4.

\* cited by examiner

TABLE 1

| TAG NUMBER | DATA | SPREADING CODE NUMBER |
|---|---|---|
| 1 | [001] | 3 |
| 2 | [010] | 6 |
| 3 | [011] | 7 |
| 4 | [100] | 12 |
| 5 | [110] | 12 |

FIG. 5

|   | Slot2 | Slot1 | Slot0 | Slot2 | Slot1 | Slot0 | ... |
|---|---|---|---|---|---|---|---|
| 1 | | | | | | | ... |
| 2 | | | | | | | ... |
| 3 | | | | | | | ... |
| 4 | | | | | | | ... |
| 5 | | | | | | | ... |
| 6 | | | | | | | ... |
| 7 | | | | | | | ... |
| 8 | | | | | | | ... |
| 9 | | | | | | | ... |
| 10 | | | | | | | ... |
| 11 | | | | | | | ... |
| 12 | | | | | | | ... |
| 13 | | | | | | | ... |
| 14 | | | | | | | ... |
| 15 | | | | | | | ... |
| 16 | | | | | | | ... |

FIG. 6A

|    | Slot2 | Slot1 | Slot0 | Slot2 | Slot1 | Slot0 | ... |
|----|-------|-------|-------|-------|-------|-------|-----|
| 1  | 0     |       |       |       |       |       | ... |
| 2  | 0     |       |       |       |       |       | ... |
| *3 | 0     |       |       |       |       |       | ... |
| 4  | 0     |       |       |       |       |       | ... |
| 5  | 0     |       |       |       |       |       | ... |
| *6 | 0     |       |       |       |       |       | ... |
| *7 | 0     |       |       |       |       |       | ... |
| 8  | 0     |       |       |       |       |       | ... |
| 9  | 0     |       |       |       |       |       | ... |
| 10 | 0     |       |       |       |       |       | ... |
| 11 | 0     |       |       |       |       |       | ... |
| **12 | 1   |       |       |       |       |       | ... |
| 13 | 0     |       |       |       |       |       | ... |
| 14 | 0     |       |       |       |       |       | ... |
| 15 | 0     |       |       |       |       |       | ... |
| 16 | 0     |       |       |       |       |       | ... |

FIG. 6B

|  | Slot2 | Slot1 | Slot0 | Slot2 | Slot1 | Slot0 | ... |
|---|---|---|---|---|---|---|---|
| 1 | 0 | 0 |  |  |  |  | ... |
| 2 | 0 | 0 |  |  |  |  | ... |
| *3 | 0 | 0 |  |  |  |  | ... |
| 4 | 0 | 0 |  |  |  |  | ... |
| 5 | 0 | 0 |  |  |  |  | ... |
| *6 | 0 | 1 |  |  |  |  | ... |
| *7 | 0 | 1 |  |  |  |  | ... |
| 8 | 0 | 0 |  |  |  |  | ... |
| 9 | 0 | 0 |  |  |  |  | ... |
| 10 | 0 | 0 |  |  |  |  | ... |
| 11 | 0 | 0 |  |  |  |  | ... |
| **12 | 1 | 0 |  |  |  |  | ... |
| 13 | 0 | 0 |  |  |  |  | ... |
| 14 | 0 | 0 |  |  |  |  | ... |
| 15 | 0 | 0 |  |  |  |  | ... |
| 16 | 0 | 0 |  |  |  |  | ... |

FIG. 6C

|     | Slot2 | Slot1 | Slot0 | Slot2 | Slot1 | Slot0 | ... |
|-----|-------|-------|-------|-------|-------|-------|-----|
| 1   | 0     | 0     | 0     |       |       |       | ... |
| 2   | 0     | 0     | 0     |       |       |       | ... |
| *3  | 0     | 0     | 1     |       |       |       | ... |
| 4   | 0     | 0     | 0     |       |       |       | ... |
| 5   | 0     | 0     | 0     |       |       |       | ... |
| *6  | 0     | 1     | 0     |       |       |       | ... |
| *7  | 0     | 1     | 1     |       |       |       | ... |
| 8   | 0     | 0     | 0     |       |       |       | ... |
| 9   | 0     | 0     | 0     |       |       |       | ... |
| 10  | 0     | 0     | 0     |       |       |       | ... |
| 11  | 0     | 0     | 0     |       |       |       | ... |
| **12| 1     | 0     | 0     |       |       |       | ... |
| 13  | 0     | 0     | 0     |       |       |       | ... |
| 14  | 0     | 0     | 0     |       |       |       | ... |
| 15  | 0     | 0     | 0     |       |       |       | ... |
| 16  | 0     | 0     | 0     |       |       |       | ... |

FIG. 6D

|  | Slot2 | Slot1 | Slot0 | Slot2 | Slot1 | Slot0 | ... |
|---|---|---|---|---|---|---|---|
| 1 | 0 | 0 | 0 | 0 |  |  | ... |
| 2 | 0 | 0 | 0 | 0 |  |  | ... |
| 3 | 0 | 0 | 1 | 0 |  |  | ... |
| 4 | 0 | 0 | 0 | 0 |  |  | ... |
| 5 | 0 | 0 | 0 | 0 |  |  | ... |
| 6 | 0 | 1 | 0 | 0 |  |  | ... |
| 7 | 0 | 1 | 1 | 0 |  |  | ... |
| 8 | 0 | 0 | 0 | 0 |  |  | ... |
| 9 | 0 | 0 | 0 | 0 |  |  | ... |
| 10 | 0 | 0 | 0 | 0 |  |  | ... |
| 11 | 0 | 0 | 0 | 0 |  |  | ... |
| *12 | 1 | 0 | 0 | 1 |  |  | ... |
| 13 | 0 | 0 | 0 | 0 |  |  | ... |
| 14 | 0 | 0 | 0 | 0 |  |  | ... |
| 15 | 0 | 0 | 0 | 0 |  |  | ... |
| 16 | 0 | 0 | 0 | 0 |  |  | ... |

FIG. 6E

|    | Slot2 | Slot1 | Slot0 | Slot2 | Slot1 | Slot0 | ... |
|----|-------|-------|-------|-------|-------|-------|-----|
| 1  | 0 | 0 | 0 | 0 | 0 | 0 | ... |
| 2  | 0 | 0 | 0 | 0 | 0 | 0 | ... |
| 3  | 0 | 0 | 1 | 0 | 0 | 0 | ... |
| 4  | 0 | 0 | 0 | 0 | 0 | 0 | ... |
| 5  | 0 | 0 | 0 | 0 | 0 | 0 | ... |
| 6  | 0 | 1 | 0 | 0 | 0 | 0 | ... |
| 7  | 0 | 1 | 1 | 0 | 0 | 0 | ... |
| 8  | 0 | 0 | 0 | 0 | 0 | 0 | ... |
| 9  | 0 | 0 | 0 | 0 | 0 | 0 | ... |
| 10 | 0 | 0 | 0 | 0 | 0 | 0 | ... |
| 11 | 0 | 0 | 0 | 0 | 0 | 0 | ... |
| *12 | 1 | 0 | 0 | 1 | 1 | 0 | ... |
| 13 | 0 | 0 | 0 | 0 | 0 | 0 | ... |
| 14 | 0 | 0 | 0 | 0 | 0 | 0 | ... |
| 15 | 0 | 0 | 0 | 0 | 0 | 0 | ... |
| 16 | 0 | 0 | 0 | 0 | 0 | 0 | ... |

FIG. 6F

|   | Round 1 | | | Round 2 | | | |
|---|---|---|---|---|---|---|---|
|   | Slot2 | Slot1 | Slot0 | Slot2 | Slot1 | Slot0 | ... |
| 1 | 0 | | | | | | ... |
| 2 | 0 | | | | | | ... |
| 3 | 0 | | | | | | ... |
| 4 | 0 | | | | | | ... |
| 5 | 0 | | | | | | ... |
| 6 | 0 | | | | | | ... |
| 7 | 0 | | | | | | ... |
| 8 | 0 | | | | | | ... |

FIG. 8A

|   | Round 1 | | | Round 2 | | | |
|---|---|---|---|---|---|---|---|
|   | Slot2 | Slot1 | Slot0 | Slot2 | Slot1 | Slot0 | ... |
| 1 | 0 | 0 | | | | | ... |
| 2 | 0 | 0 | | | | | ... |
| 3 | 0 | 0 | | | | | ... |
| 4 | 0 | 0 | | | | | ... |
| 5 | 0 | 0 | | | | | ... |
| 6 | 0 | 0 | | | | | ... |
| 7 | 0 | 0 | | | | | ... |
| 8 | 0 | 0 | | | | | ... |

FIG. 8B

|   | Round 1 | | | Round 2 | | | |
|---|---|---|---|---|---|---|---|
|   | Slot2 | Slot1 | Slot0 | Slot2 | Slot1 | Slot0 | ... |
| 1 | 0 | 0 | 0 |   |   |   | ... |
| 2 | 0 | 0 | 0 |   |   |   | ... |
| 3 | 0 | 0 | 0 |   |   |   | ... |
| 4 | 0 | 0 | 0 |   |   |   | ... |
| 5 | 0 | 0 | 0 |   |   |   | ... |
| 6 | 0 | 0 | 0 |   |   |   | ... |
| 7 | 0 | 0 | 0 |   |   |   | ... |
| 8 | 0 | 0 | 0 |   |   |   | ... |

FIG. 8C

|   | Round 1 | | | Round 2 | | | |
|---|---|---|---|---|---|---|---|
|   | Slot2 | Slot1 | Slot0 | Slot2 | Slot1 | Slot0 | ... |
| 1 | 0 | 0 | 0 | 1 |   |   | ... |
| 2 | 0 | 0 | 0 | 1 |   |   | ... |
| 3 | 0 | 0 | 0 | 1 |   |   | ... |
| 4 | 0 | 0 | 0 | 1 |   |   | ... |
| 5 | 0 | 0 | 0 | 1 |   |   | ... |
| 6 | 0 | 0 | 0 | 1 |   |   | ... |
| 7 | 0 | 0 | 0 | 1 |   |   | ... |
| 8 | 0 | 0 | 0 | 1 |   |   | ... |

FIG. 8D

|   | Round 1 | | | Round 2 | | | |
|---|---|---|---|---|---|---|---|
|   | Slot2 | Slot1 | Slot0 | Slot2 | Slot1 | Slot0 | ... |
| 1 | 0 | 0 | 0 | 1 | 0 |   | ... |
| 2 | 0 | 0 | 0 | 1 | 0 |   | ... |
| 3 | 0 | 0 | 0 | 1 | 0 |   | ... |
| 4 | 0 | 0 | 0 | 1 | 0 |   | ... |
| 5 | 0 | 0 | 0 | 1 | 0 |   | ... |
| 6 | 0 | 0 | 0 | 1 | 0 |   | ... |
| 7 | 0 | 0 | 0 | 1 | 0 |   | ... |
| 8 | 0 | 0 | 0 | 1 | 0 |   | ... |

FIG. 8E

|   | Round 1 | | | Round 2 | | | |
|---|---|---|---|---|---|---|---|
|   | Slot2 | Slot1 | Slot0 | Slot2 | Slot1 | Slot0 | ... |
| 1 | 0 | 0 | 0 | 1 | 0 | 0 | ... |
| 2 | 0 | 0 | 0 | 1 | 0 | 0 | ... |
| 3 | 0 | 0 | 0 | 1 | 0 | 0 | ... |
| 4 | 0 | 0 | 0 | 1 | 0 | 0 | ... |
| 5 | 0 | 0 | 0 | 1 | 0 | 0 | ... |
| 6 | 0 | 0 | 0 | 1 | 0 | 0 | ... |
| 7 | 0 | 0 | 0 | 1 | 0 | 0 | ... |
| 8 | 0 | 0 | 0 | 1 | 0 | 0 | ... |

FIG. 8F

|   | Round 3 | | | Round 4 | | | |
|---|---|---|---|---|---|---|---|
|   | Slot2 | Slot1 | Slot0 | Slot2 | Slot1 | Slot0 | ... |
| 1 | 0 | 1 | 0 | 1 | 1 | 0 | ... |
| 2 | 0 | 1 | 0 | 1 | 1 | 0 | ... |
| 3 | 0 | 1 | 0 | 1 | 1 | 0 | ... |
| 4 | 0 | 1 | 0 | 1 | 1 | 0 | ... |
| 5 | 0 | 1 | 0 | 1 | 1 | 0 | ... |
| 6 | 0 | 1 | 0 | 1 | 1 | 0 | ... |
| 7 | 0 | 1 | 0 | 1 | 1 | 0 | ... |
| 8 | 0 | 1 | 0 | 1 | 1 | 0 | ... |

FIG. 8G

|   | Round 5 | | | Round 6 | | | |
|---|---|---|---|---|---|---|---|
|   | Slot2 | Slot1 | Slot0 | Slot2 | Slot1 | Slot0 | ... |
| 1 | 0 | 0 | 1 | 1 | 0 | 1 | ... |
| 2 | 0 | 0 | 1 | 1 | 0 | 1 | ... |
| 3 | 0 | 0 | 1 | 1 | 0 | 1 | ... |
| 4 | 0 | 0 | 1 | 1 | 0 | 1 | ... |
| 5 | 0 | 0 | 1 | 1 | 0 | 1 | ... |
| 6 | 0 | 0 | 1 | 1 | 0 | 1 | ... |
| 7 | 0 | 0 | 1 | 1 | 0 | 1 | ... |
| 8 | 0 | 0 | 1 | 1 | 0 | 1 | ... |

FIG. 8H

|   | Round 7 | | | Round 8 | | | |
|---|---|---|---|---|---|---|---|
|   | Slot2 | Slot1 | Slot0 | Slot2 | Slot1 | Slot0 | ... |
| 1 | 0 | 1 | 1 | 1 | 1 | 1 | ... |
| 2 | 0 | 1 | 1 | 1 | 1 | 1 | ... |
| 3 | 0 | 1 | 1 | 1 | 1 | 1 | ... |
| 4 | 0 | 1 | 1 | 1 | 1 | 1 | ... |
| 5 | 0 | 1 | 1 | 1 | 1 | 1 | ... |
| 6 | 0 | 1 | 1 | 1 | 1 | 1 | ... |
| 7 | 0 | 1 | 1 | 1 | 1 | 1 | ... |
| 8 | 0 | 1 | 1 | 1 | 1 | 1 | ... |

FIG. 81

TABLE 2

| Group 0 | | Group 1 | | ... | Group 7 | |
|---|---|---|---|---|---|---|
| Tag Number | Data | Tag Number | Data | ... | Tag Number | Data |
| Tag 0 | [000] | Tag 0 | [000] | | Tag 0 | [000] |
| Tag 1 | [001] | Tag 1 | [001] | | Tag 1 | [001] |
| Tag 2 | [010] | Tag 2 | [010] | | Tag 2 | [010] |
| Tag 3 | [011] | Tag 3 | [011] | | Tag 3 | [011] |
| Tag 4 | [100] | Tag 4 | [100] | | Tag 4 | [100] |
| Tag 5 | [101] | Tag 5 | [101] | | Tag 5 | [101] |
| Tag 6 | [110] | Tag 6 | [110] | | Tag 6 | [110] |
| Tag 7 | [111] | Tag 7 | [111] | | Tag 7 | [111] |

FIG. 9

EARLY COLLISION DETECTION AND HANDLING IN CDMA-BASED RFID SYSTEMS

TECHNICAL FIELD

The present invention relates generally to radio-frequency identification (RFID) systems, and more particularly to enabling early collision detection and handling in Code Division Multiple Access (CDMA)-based RFID systems.

BACKGROUND

Radio-frequency identification (RFID) uses electromagnetic fields to automatically identify and track tags attached to objects. The tags contain electronically stored information. Passive tags collect energy from a nearby RFID reader's (also referred to as an "interrogator") interrogating radio waves.

Unlike a barcode, the tag does not need to be within the line of sight of the reader. As a result, it may be embedded in the tracked object.

RFID tags are used in many industries. For example, an RFID tag may be attached to an automobile during production in order to track its progress through the assembly line. In another example, RFID-tagged pharmaceuticals can be tracked through warehouses. In a further example, RFID microchips may be implanted in livestock and pets in order to allow for positive identification of the animals.

The use of RFID in asset and inventory management applications continues to increase. Typical RFID systems consist of readers (interrogators) and tags—the tags contain an embedded chip and an antenna. In some systems, when a tag appears within the range of the reader, the reader "wakes up" and receives an encoded signal from a tag. In other systems, the reader may be instructed manually to read the tags within range. This information contained in the signal is decoded by the electronics in the reader and sent to the inventory asset management system for tracking and processing purposes. RFID systems can provide tremendous increases in processing speeds for inventory management compared to traditional barcode scanning methodologies and techniques. In CDMA-based RFID systems, Frequency Division Multiple Access (FDMA)-based systems, or Time Division Multiple Access (TDMA)-based systems with multiple readers, instead of processing items in a linear manner, multiple items within the range of the reader can be read and inventoried at the same time. RFID tag technology has reached a point where the need to have tags be visible or in the line-of-sight of the reader is not required anymore.

When an RFID system is used for an application, such as inventory, the interrogator powers up all the tags within its range, instructs them to generate a random number which is used to determine their wait time before responding, and then acknowledges and reads each tag as their turn (or slot) is called. However, in such a protocol (referred to as Slotted ALOHA), collisions (tag collisions) may occur. Tag collisions occur when multiple tag reflections interfere with one another thereby preventing proper reading of the colliding tags. Passive tag collisions are difficult to solve but due to the passive tags' potentially ubiquitous use, low power solutions to the collision problems in passive RFID systems are extremely valuable.

Code-division multiple access (CDMA) is a channel access method used by various radio communication technologies, such as being used for data communications between the reader and the tag in RFID systems. Another channel access method is the Time Division Multiple Access (TDMA) for shared-medium networks. It allows several users to share the same frequency channel by dividing the signal into different time slots. CDMA-based systems offer several advantages over TDMA systems, the main one being the ability to improve avoidance of overlapping signals (collisions) between multiple tags as discussed above—which limits the readers' ability to effectively gather information from all transmitting tags. In CDMA systems, a collision occurs when multiple tags use the same spreading code as opposed to collisions occurring in TDMA systems when multiple tags occupy the same time slot. Anti-collision techniques with CDMA techniques have the potential to allow for a higher throughput because users (tags) can communicate simultaneously and thus can increase the throughput of each round. CDMA-based systems allow for any users' data to be transmitted at any time and the anti-collision mechanisms allow for overlapping signals to be sorted out through the processes of despreading so long as the users' data is encoded according to a unique or nearly-unique spreading code.

Unfortunately, the collision handling protocol (protocol to handle collisions) is not automated and does not remove colliding tags until they have already interfered with the entire transmission of non-colliding tags.

Furthermore, CDMA in passive RFID systems has struggled to gain widespread acceptance and use due to the limitations presented by the near-far problem. The near-far problem is a condition in which a receiver captures a strong signal and thereby makes it impossible for the receiver to detect a weaker signal. The near-far problem is caused by users in a CDMA system transmitting at significantly different enough power levels that the signal-to-noise ratio (SNR), in the form of signal-to-interference ratio (SIR), of some users' transmission is so high to prevent accurate communication with such users.

Hence, there is not currently a means for effectively handling collisions or addressing the near-far problem in CDMA-based passive RFID systems.

SUMMARY

In one embodiment of the present invention, a method for enabling early collision detection and handling in Code Division Multiple Access (CDMA)-based radio-frequency identification (RFID) systems comprises receiving an instruction to reflect either a single encoded bit or multiple encoded bits. The method further comprises reflecting either the single encoded bit or the multiple encoded bits to a reader, wherein the reader decodes the single encoded bit or the multiple encoded bits, wherein the decoded bit or bits are placed in a vector or a matrix by the reader. The method additionally comprises receiving the vector or the matrix. Furthermore, the method comprises determining if the reflected bit or bits agree with a corresponding bit or bits in the vector or the matrix thereby indicating whether the reflected bit or bits were read successfully by the reader. Additionally, the method comprises entering a no reflection mode in response to a disagreement between the reflected bit or bits with the corresponding bit or bits in the vector or the matrix.

Other forms of the embodiment of the method described above are in a computer program product and an RFID tag.

In another embodiment of the present invention, a method for enabling early collision detection and handling in Code Division Multiple Access (CDMA)-based radio-frequency identification (RFID) systems comprises receiving a reflected single encoded bit or a reflected multiple encoded bits from a tag. The method further comprises decoding the single encoded bit or the multiple encoded bits. The method additionally comprises placing the decoded bit or bits in a vector or a matrix. Furthermore, the method comprises transmitting the vector or the matrix to the tag, wherein the tag determines if the reflected bit or bits agree with a corresponding bit or bits in the vector or the matrix thereby indicating whether the reflected bit or bits were read successfully, where the tag enters a no reflection mode in response to a disagreement between the reflected bit or bits with the corresponding bit or bits in the vector or the matrix.

Other forms of the embodiment of the method described above are in a computer program product and a reader.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 5 is a table, Table 1, illustrating an example system using 16 spreading codes and five 3-bit tags in accordance with an embodiment of the present invention;

FIGS. 6A-6F illustrate an example (Example 1) how the Bitwise CDMA (B-CDMA) protocol functions in accordance with an embodiment of the present invention;

FIGS. 8A-8I illustrate an example (Example 2) how the B-CDMA protocol functions in accordance with an embodiment of the present invention; and FIG. 9 is a table, Table 2, showing the 8 groups containing the tags in accordance with an embodiment of the present invention.

DETAILED DESCRIPTION

Figure 1:
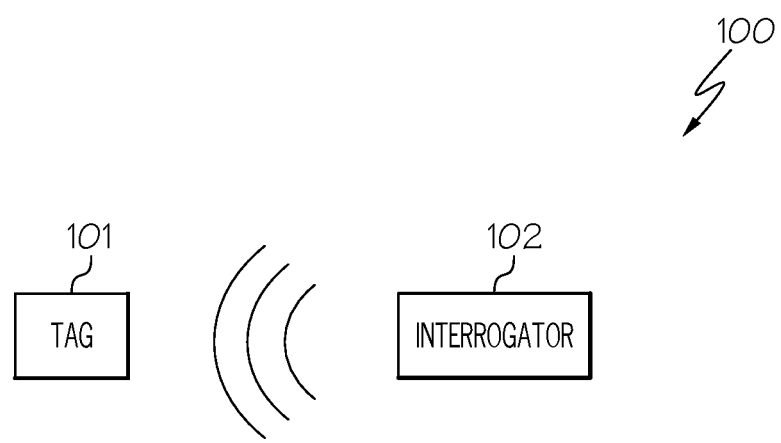
FIG. 1 illustrates an RFID system in accordance with an embodiment of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

The present invention provides further innovation in the application of CDMA direct sequence spread spectrum techniques to further improve the performance of passive RFID systems. It can extract information regarding colliding tags from a tag population and enable improvement in maximizing the possible number of tags that can be read accurately and simultaneously. Embodiments of the present invention would be especially applicable for CDMA-based RFID interrogator systems, which need to operate under limited power, size or weight constraints or where security and operational speed are important. Environments, such as wireless research laboratories with high noise environments, defense applications in which power output of RFID systems should be kept low to prevent detection or environments where tags need to be read simultaneously with a single antenna at sporting events are prime examples of uses for this innovation.

As discussed in the Background section, CDMA-based systems allow for any users' data to be transmitted at any time and the anti-collision mechanisms allow for overlapping signals to be sorted out through the processes of despreading so long as the users' data is encoded according to a unique or nearly-unique spreading code. Unfortunately, the collision handling protocol (protocol to handle collisions) is not automated and does not remove colliding tags until they have already interfered with the entire transmission of non-colliding tags. Furthermore, CDMA in passive RFID systems has struggled to gain widespread acceptance and use due to the limitations presented by the near-far problem. The near-far problem is a condition in which a receiver captures a strong signal and thereby makes it impossible for the receiver to detect a weaker signal. The near-far problem is caused by users in a CDMA system transmitting at significantly different enough power levels that the signal-to-noise ratio (SNR), in the form of signal-to-interference ratio (SIR), of some users' transmission is so high to prevent accurate communication with such users. Hence, there is not currently a means for effectively handling collisions or addressing the near-far problem in CDMA-based passive RFID systems.

Embodiments of the present invention provide the means for addressing the near-far problem as well as automating the collision handling by removing colliding tags earlier than other systems do, thus increasing the signal-to-noise ratio (SNR)/signal-to-interference ratio (SIR) of the non-collided tags during their transmission and automating of the on-the-fly creation of additional inventory rounds to read the tags that were in collision in previous inventory rounds.

As discussed above, in CDMA systems, a collision occurs when multiple tags use the same spreading code. The present invention provides a solution to the problem of same code collision in CDMA systems.

In one embodiment, the present invention performs a collision detection and control protocol using each bit of transmission rather than each transmitted packet. Furthermore, in one embodiment, the protocol of the present invention uses the built-in tag circuitry that instructs the tag to "shut off" or "wait" as an automated aspect of the protocol rather than having the interrogator specifically instruct the tag to do so.

Referring now to the Figures in detail, FIG. 1 illustrates a RFID system 100 in accordance with an embodiment of the present invention. RFID system 100 includes an RFID tag 101 with built-in circuitry and an antenna (not shown) and an interrogator (reader) 102. When tag 101 appears within the range of interrogator 102, interrogator 102 "wakes up" and receives an encoded signal from tag 101.

This information contained in the signal is decoded by the electronics (not shown) in interrogator 102 and sent to the inventory asset management system for tracking and processing purposes. A block diagram of MID tag 101 is discussed below in connection with FIG. 2 and a block diagram of interrogator 102 is discussed below in connection with FIG. 3.

While FIG. 1 illustrates a single tag 101 and a single interrogator 102, RFID system 100 may include any number of tags 101 and interrogators 102.

Figure 2:
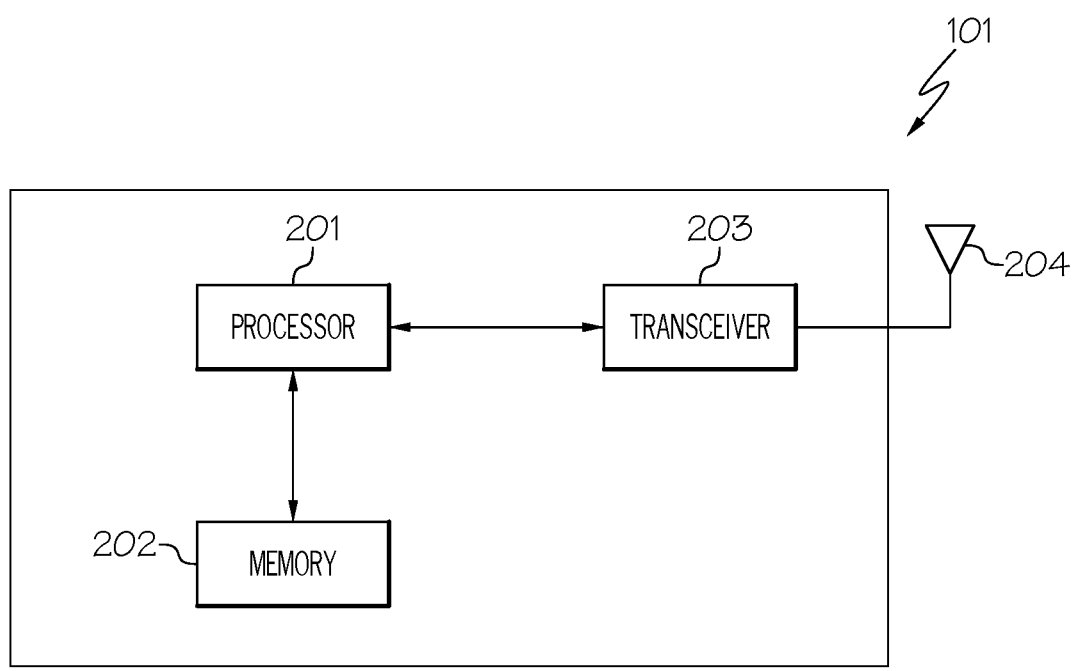
FIG. 2 is a block diagram of a passive RFID tag in accordance with an embodiment of the present invention.

Referring now to FIG. 2 in conjunction with FIG. 1, FIG. 2 is a block diagram of a passive RFID tag 101 in accordance with an embodiment of the present invention. Passive RFID tag 101 includes a processor 201, a memory 202 (e.g., non-volatile memory), a transceiver 203 and an antenna 204. A power source is not used by a passive RFID tag as it collects energy from a nearby RFID reader's interrogating radio waves.

In one embodiment, transceiver 203 includes a transmitter and a receiver coupled to antenna 204 to transmit and receive radio frequency (RF) signals.

In one embodiment, an application for performing a collision detection and control protocol using each bit of transmission, as discussed below in connection with FIGS. 4-5, 6A-6F, 7, 8A-8I and 9, is loaded into memory 202 for execution by processor 201.

Tag 101 is not to be limited in scope to the elements depicted in FIG. 2. Tag 101 may include other components that were not discussed herein for the sake of brevity.

The present invention may be a system, a method, and/or a computer program product. The computer program product may include a computer readable storage medium (or media) having computer readable program instructions thereon for causing a processor to carry out aspects of the present invention. The computer readable storage medium may be, for example, memory 202 corresponding to non-volatile memory (e.g., flash memory). A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Figure 3:
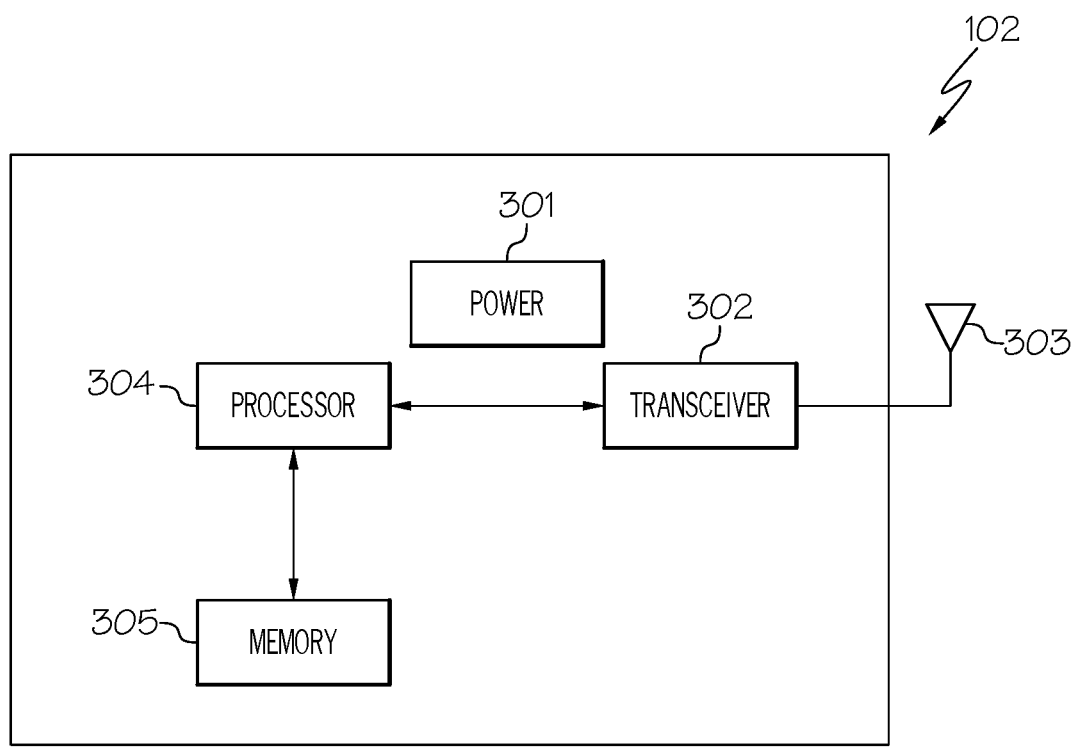
FIG. 3 is a block diagram of a reader/interrogator in accordance with an embodiment of the present invention.

Referring now to FIG. 3, in conjunction with FIG. 1, FIG. 3 is a block diagram of reader/interrogator 102 in accordance with an embodiment of the present invention. Interrogator 102 includes a power source 301 (e.g., Lithium-Ion battery), an electronic transceiver circuitry 302, an antenna 303, a processor 304 and memory 305 (e.g., random memory, non-volatile memory).

In one embodiment, transceiver 302 includes a transmitter and a receiver coupled to antenna 303 to transmit and receive radio frequency (RF) signals.

In one embodiment, an application for performing a collision detection and control protocol using each bit of transmission, as discussed below in connection with FIGS. 4-5, 6A-6F, 7, 8A-8I and 9, is loaded into memory 305 for execution by processor 304.

Reader/interrogator 102 is not to be limited in scope to the elements depicted in FIG. 3. Reader/interrogator 102 may include other components (e.g., oscillator) that were not discussed herein for the sake of brevity.

The present invention may be a system, a method, and/or a computer program product. The computer program product may include a computer readable storage medium (or media) having computer readable program instructions thereon for causing a processor to carry out aspects of the present invention. The computer readable storage medium may be, for example, memory 305. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Embodiments of the present invention utilize a protocol that allows for automated handling of the near-far problem in passive communication without the requirement of user transmission/reflection power adjustment, allows for simultaneous reception of data from multiple users, and increases the communication system's robustness in the presence of ambient noise. This protocol allows for the maximum number of possible simultaneous user transmissions and automatically generates the number of necessary rounds to complete communication with all users on-the-fly. As such, an incremental increase in users does not necessarily cause an increase in the amount of time to complete communication with all the users. A discussion regarding such a protocol is provided below in connection with FIG. 4.

Figure 4:
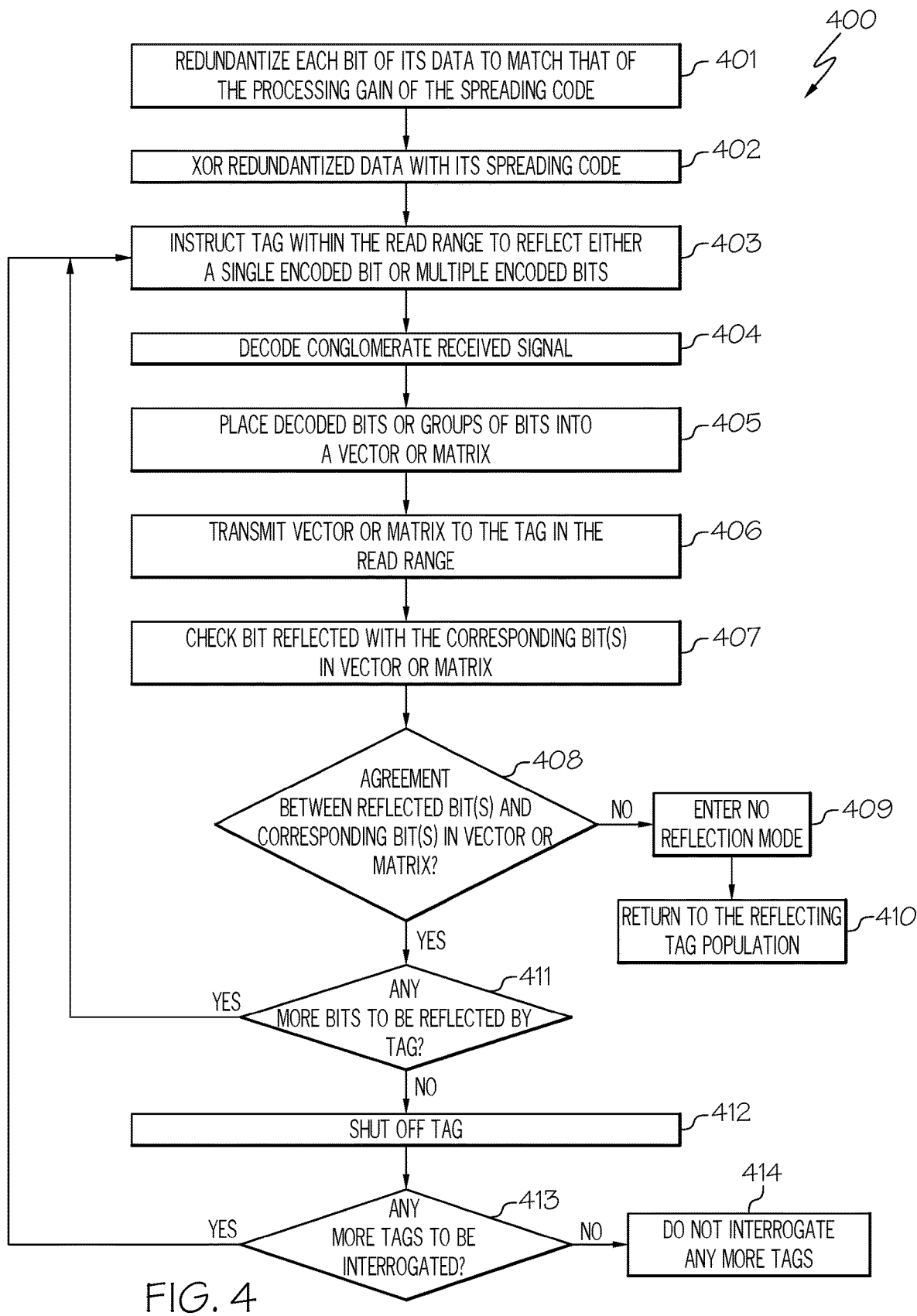
FIG. 4 is a flowchart of a method for automating the collision handling and handling the near-far problem in passive communication in accordance with an embodiment of the present invention.

FIG. 4 is a flowchart of a method 400 for automating the collision handling and handling the near-far problem in passive communication in accordance with an embodiment of the present invention.

In connection with implementing method 400, each tag 101 contains its data as well as a single spreading code, multiple spreading codes, or has the ability to generate a spreading code. These spreading codes can be generated using any known method.

Referring to FIG. 4, in conjunction with FIGS. 1-3, in step 401, tag 101 redundantizes each bit of its data to match that of the processing gain of the spreading code.

In step 402, tag 101 XORs its redundantized data with its spreading code.

In step 403, reader/interrogator 102 instructs tag 101 within its read range to reflect either a single encoded bit or multiple encoded bits. Tag 101 then reflects a single encoded bit or multiple encoded bits to reader/interrogator 102. While the foregoing discusses a single instance of tag 101, it is noted for clarity that reader/interrogator 102 may instruct multiple tags 101 within its read range to reflect either a single encoded bit or multiple encoded bits. In one embodiment, reader/interrogator 102 may instruct tag 101 to reflect either a single encoded bit or multiple encoded bits prior to step 403. Furthermore, such an instruction may be unnecessary based on an agreement between tag 101 and reader/interrogator 102.

In step 404, reader/interrogator 102 uses each of the spreading codes used in the system to decode the conglomerate received signal. That is, reader/interrogator 102 decodes the reflected single encoded bit or the reflected multiple encoded bits.

In step 405, reader/interrogator 102 places the decoded bits or groups of bits into a vector or matrix, respectively. If the decoding shows a strong "1," then a "1" will be placed into the vector/matrix. If the decoding shows a strong "0," a "0" will be placed into the vector/matrix. In one embodiment, if there is an indeterminate (e.g., neither strong "1" nor strong "0"), a "0" will be placed into the vector/matrix. Alternatively, in another embodiment, a "1" is placed into the vector/matrix if there is an indeterminate so long as every component of the system agrees.

In step 406, reader/interrogator 102 transmits the vector or matrix to tag 101 in the read range.

In step 407, tag 101 checks the bit it reflected with the corresponding bit(s) in the vector or matrix.

In step 408, a determination is made by tag 101 as to whether the bits (reflected and corresponding bits in the vector or matrix) agree to determine if the reflected bit or bits were read successfully. If the bits do not agree, then it may indicate that reader/interrogator 102 cannot read the bit due to a collision.

If there is no agreement, then, in step 409, tag 101 enters a "no reflection mode" thereby preventing tag 101 from reflecting any further encoded bit(s) until instructed otherwise. By not reflecting any further encoded bit(s) until instructed otherwise, collisions between multiple tags are avoided.

Later, in step 410, tag 101 returns to the reflecting tag population. In one embodiment, tag 101 automatically begins reflecting again when it returns to a particular state of the state machine.

If, however, the bits agree, then, in step 411, a determination is made by tag 101 as to whether there are more bits to be reflected.

If there are more bits to be reflected, then tag 101 reflects another single encoded bit or multiple encoded bits to reader/interrogator 102 in step 403.

If, however, there are no more bits to be reflected, then, in step 412, tag 101 enters a "shut down" mode (i.e., tag 101 is shut off). That is, tag 101 enters a "shut down" mode in response to having all of its bits read successfully by reader/interrogator 102.

In step 413, a determination is made by reader/interrogator 102 as to whether there are any more tags 101 to be interrogated.

If there are no more tags 101 to be interrogated, then, in step 414, reader/interrogator 102 does not interrogate any more tags.

If, however, there are more tags 101 to be interrogated, then reader/interrogator 102 instructs another tag 101 within its read range to reflect either a single encoded bit or multiple encoded bits in step 403.

A further discussion regarding method 400 is provided below.

The following discusses a novel medium access control protocol referred to herein as the "Bitwise CDMA." A description of the protocol is provided further below.

Before Bitwise CDMA (or B-CDMA) is discussed, it is valuable to assess the shortcomings of the previously used implementations that need to be addressed.

In the Slotted ALOHA system, the disadvantage is that truly simultaneous tag readings are not possible. However, Slotted ALOHA can potentially outperform CDMA in total number of transmitted bits per read tag. CDMA has the advantage of having far more robustness in high noise environments due to the redundancy used in its encoding. It is noted that Slotted ALOHA only has the potential to outperform CDMA in the comparison between straight CDMA and Slotted ALOHA in specific configurations and that Slotted ALOHA only outperforms bitwise CDMA in corner cases. It also noted that while Slotted ALOHA outperforms CDMA in a great number of bit transmissions per tag, it does not indicate any performance superiority regarding time/power efficiency because while CDMA transmits more bits in the communication, the users' reflections are occurring simultaneously.

In the straight CDMA system, tags can be read simultaneously, but if a particular spreading code is used by more than one tag at the same time, the tags using that spreading code cannot be accurately read without additional collision handling protocols for same code collisions. A "straight CDMA system," as used herein, refers to the simplest implementation of CDMA in which tags use spreading codes but there are no time slots and early collision detection is not performed.

In the combination TDMA-CDMA, it is less likely that tags will collide since a collision will only occur when two or more tags share both a slot and a spreading code, but this system still suffers from the fact that only a fraction of the slots will read more than one tag at a time, even if all tags could potentially be read simultaneously. For example, if there are N tags and S codes in a TDMA-CDMA system, with N<S and no tags share a spreading code, all the tags could potentially be read within a single slot if the processing gain is sufficiently high. However, all the tags are unlikely to randomly generate the same slot and the interrogator will attempt to read tags at each slot regardless of their presence, thus leading to an inefficiency of time and power which arises from the interrogator attempting to read empty slots.

B-CDMA solves this problem by generating the necessary number of slots on-the-fly while reading the maximum number of tags during each slot and removing colliding tags with the transmission of each encoded data bit. It should be noted that in B-CDMA, "slot" does not refer to an assigned or randomly-generated time slot as it would in a TDMA system. A B-CDMA "slot" simply indicates the time from the beginning of the reflection of the first tag data (e.g., Electronic Product Code (EPC) data) bit to the conclusion of the reflection of the final tag data (e.g., EPC data) bit. The B-CDMA algorithm was previously discussed above in connection with FIG. 4.

The B-CDMA algorithm allows for the interrogator to read the maximum number of tags at each slot and/or read the tag(s) with the highest received power, mitigating the issues resulting from the near-far problem (and shadowing). Each subsequent slot reads the next highest number of tags that can be simultaneously read and/or the tag(s) with the next highest received power. The robustness of this implementation is achieved through both the redundancy created by the spreading codes and the ability to eliminate colliding tags before they complete their entire tag data (e.g., EPC data) transmission. This error control aspect of B-CDMA differs from the Adaptive Interference Cancellation (AIC) method in that AIC does not eliminate or even identify potentially colliding tags or very "loud" tags until the end of an inventory round. The error control procedure in B-CDMA is able to totally eliminate interference from colliding tags as soon as they are detected, thus creating an even more robust CDMA-based MAC protocol.

T=Total number of tags in population
N=Number of tags being read in current inventory round
R=Number of tags that have been successfully read and shut off
r=Number of tags found to be colliding and have been removed from current round
n=Number of bits in the tag data (e.g., EPC data)
At the beginning of the first inventory round, $$N=T$$

After the first tag data (e.g., EPC data) bit is read and tags that were found to collide were instructed to either continue or to wait, $$N=T-r_0$$

where $r_o$=number of collided tags that were removed (instructed to enter no-transmit mode) after reading the first tag data (e.g., EPC data) bit, $b_o$.

After the second tag data (e.g., EPC data) bit is read, $$N = T - (r_0 + r_1)$$

After the final tag data (e.g., EPC data) bit, $b_n$ is read, $$N = T - R_0 + \sum_{i=0}^{n} r_i$$

where $R_o$=number of tags that were successfully read and instructed to shut off at the end of the first round.

At the end of the second inventory round, $$N = T - (R_0 + R_1) + \sum_{i=n+1}^{2n} r_i$$

where $R_1$=number of tags that were successfully read and shut off at the end of the second round.

When all of the tags are read, N will be zero and the interrogator, after attempting to decode the next group of tags, will find no tags left in the read-range, at which point the interrogator will shut off and the inventory reading will be considered to be complete. This will be evident to the interrogator by the first several decoded bits of all tags being indeterminate.

Beginning with the assumption that all tags will reflect a signal at the same or very close signal power level and assuming the tags are relatively synchronized, the expected number of inventory rounds can be characterized as, if $T \leq E$ and spreading codes are not reused, $$E[K] = 1$$

where K=the number of inventory rounds to read all of the tags in the read range Assuming no tags use both the same code and contain the same tag data (e.g., EPC data), if $E < T \leq 2E$, $E[K] = 2$ As can be extrapolated from the above equations, in general, $$E[K] = \frac{T}{E}, \text{ rounded up to the nearest interger}$$

Of course, without perfect synchronization and/or without highly orthogonal codes, T has an upper bound that can be increased by increasing SIR (e.g., increasing processing gain).

Since the system of the present invention removes colliding tags after reading each tag data (e.g., EPC data) bit, the SIR of the system increases when each bit is read until all the colliding tags are removed. The caveat of the tags not using the same code and containing the same tag data (e.g., EPC data) is removed by the use of short handles.

Assuming an equal likelihood of a tag transmitting an encoded tag data (e.g., EPC data) bit "1" or "0," and a large tag population with each tag equally likely to use any of the possible spreading codes, the number of tags removed at the end of each inventory round can be expressed by, $$P(\text{bit}=1) = P(\text{bit}=0) = 0.5$$

$$P(\text{decoded bit}=1) = P(\text{decoded bit}=0) = 0.5$$

$$P(\text{EPC bit}=\text{Check Vector bit}) = P(\text{EPCbit} \neq \text{lector bit})$$
$$= 0.5$$

And since a tag removes itself if the tag data (e.g., EPC data) bit that is currently being read disagrees with its corresponding bit within the test vector, the number of colliding tags that enter no-transmit mode at each bit can be represented by, $$r = \lceil 0.5 N' \rceil$$

where N'=number of collided tags.

The total number of tags rejected at the end of each inventory round is therefore approximately, $$r_T = (0.5)N' + (0.5)^2 N' + \ldots + (0.5)^n N'$$

from the first bit until the bit at which all colliders are removed. Thus, the number of tags read at the end of each inventory round can be stated as, $$R = T - r_T$$

The addition of the check vector after each tag data (e.g., EPC data) bit transmitted by the tags may increase the number of bits transmitted by the interrogator compared to the ideal scenario of Slotted ALOHA (e.g., number of tags=number of slots, no collisions) but from an information theory and interrogator power usage perspective, this system is more efficient in that it receives information for every transmission and has better performance if collisions occur. The length of the vector has some predictability and can therefore be compressed. This predictability arises from the fact that if a bit cannot be read, due to a collision or a lack of a tag using the spreading code corresponding to one or more bits in the check vector, it is assumed to be a "0." This assumption makes it more likely that any given bit in the check vector will be a "0" than is likely to be a "1."

The following discusses an example (Example 1) of using the B-CDMA implementation.

In this implementation, the tag acts as an n+1 state finite state machine (states n, n−1, n−2, . . . , 0, Z), where n=number of bits in the tag data (e.g., EPC data). The initial state of the tag is "State n" and the final state is "State Z." In State n, the tag reflects its first encoded tag data (e.g., EPC data) bit to the interrogator. The tag then moves to State n−1. In State n−1, the tag receives the check vector from the interrogator and uses an XNOR on its corresponding bit in the check vector and on its tag data (e.g., EPC data) bit n to set its "reflection" flag. If the reflection flag is set, signifying that the first encoded tag data (e.g., EPC data) bit was successfully received by the interrogator, then the tag reflects its n−1 bit to the interrogator and moves to State n−2. In State n−2, if the flag is not set, then the tag does not reflect any data (e.g., the tag enters no-transmit mode). In State n−2, the tag data (e.g., EPC data) bit is only reflected if the reflect flags for both bit n and bit n−1 were set. This continues until the tag reaches its State 0. In State 0, if all previous reflect flags were set, then the tag reflects its bit 0 of the tag data (e.g., EPC data). Finally, after reflecting the final tag data (e.g., EPC data) bit, the tag receives one more check vector in State Z and it sets its reflect flag one final time for this inventory round. If the flag is set, then the tag remains in State Z, which is its "off" state. If the flag is not set, then the tag goes back to State n and retries reflecting bit n. An example system using 16 spreading codes and five 3-bit tags can be seen in Table 1 of FIG. 5 in accordance with an embodiment of the present invention.

Referring to Table 1 of FIG. 5, using the above example with five tags, three of which use unique spreading codes, and two of which use colliding spreading codes, one can create an example to illustrate how this protocol functions as shown in FIGS. 6A-6F. FIGS. 6A-6F illustrate an example (Example 1) of how the B-CDMA protocol functions in accordance with an embodiment of the present invention. A discussion regarding FIGS. 6A-6F in conjunction with FIGS. 1-3 will now be provided.

In FIG. 6A, each entry represents the bit decoded by interrogator 102 using each one of the spreading codes on the vertical axis, during each one of the tag data (e.g., EPC data) bit slots shown on the horizontal axis. A strong "1" is represented by a "1," a strong "0" is represented by a "0," and an indeterminate bit that is set as a "0" is represented by a "0." A "hit" on a spreading code is represented using an "*."

FIG. 6B shows the bits decoded by interrogator 102 after the first bit (MSB) is reflected by tags 101. The first column is used as the first check vector that sets the reflect flags of tags 101. In this first reflection, interrogator 102 has found hits on codes 3, 6, 7, and 12 but since tags 4 and 5 sent the same bit using the same code, interrogator 102 has no indication that there is a collision.

FIG. 6C shows the bits decoded by interrogator 102 after the next reflection. Again, interrogator 102 has found hits using codes 3, 6, 7, and 12, but since tags 4 and 5 reflected opposite bits using the same code, there is a collision and tag 5 is removed. The SIR for tags 1, 2, 3, and 4 have now increased due to the removal of tag 5. Now, tag 5 is in its "no transmit" state until the next round begins.

FIG. 6D shows the bits decoded by interrogator 102 after the next reflection. At this point, the third and final check vector is transmitted. Tags 1, 2, 3, and 4 have reflected their full tag data (e.g., EPCs) and interrogator 102 has accurately read and stored their data. As such, tags 1, 2, 3, and 4 enter their "off" state. Since the reflect flag was not set for tag 5, it continues to transmit in the next round automatically.

FIG. 6E shows the bits decoded by interrogator 102 after the next reflection. Now, the only tag in the system is tag 5 and code 12 is the only code with a "hit." The process continues until tag 5 is read. Tag 5's SIR is significantly higher than it was in the previous round because it is now the only tag responding.

Interrogator 102 then begins another inventory round but will conclude that there are no tags in range if the first several slots are all indeterminate as shown in FIG. 6F.

Figure 7:
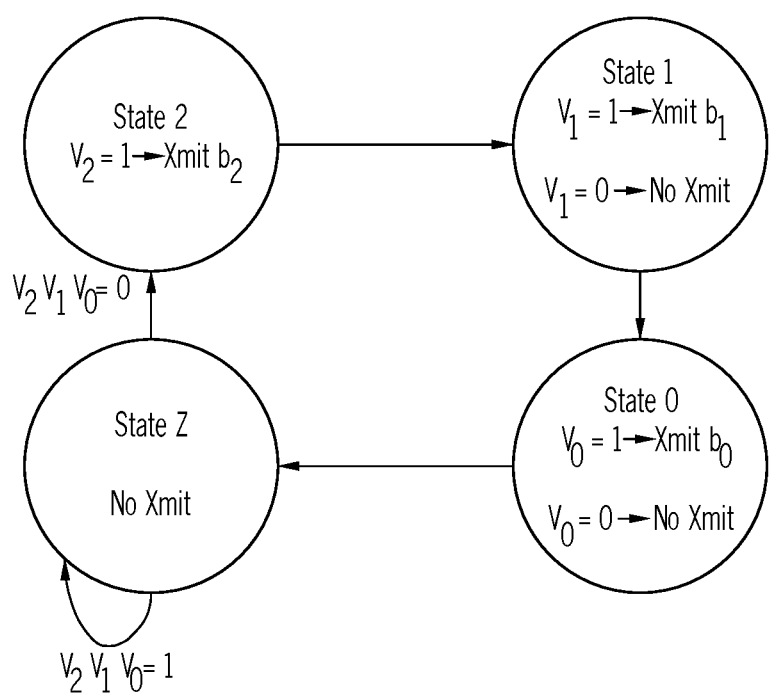
FIG. 7 illustrates the state machine of the 3-bit tag in the B-CDMA system in accordance with an embodiment of the present invention.

Referring now to FIG. 7, FIG. 7 illustrates the state machine of the 3-bit tag in the B-CDMA system in accordance with an embodiment of the present invention. If V=1, the "reflection" flag is set to be true. However, if V=0, then the "reflection" flag is set to be false.

Another example (Example 2) illustrating how the B-CDMA protocol functions is shown in FIGS. 8A-8I in accordance with an embodiment of the present invention.

There are several possible scenarios in B-CDMA systems: Not all codes are used and each used code is used exactly once, not all codes are used and some codes are used more than once, all codes are used and each code is only used once, all codes are used and some codes are used more than once, and the scenario where all codes are used more than once. These scenarios are examined using the following assumptions:
1. E=The number of codes used in the system
2. N=Number of tags
3. P=Processing gain
4. $BER_{max}$=Maximum acceptable BER
5. P is sufficiently large such that requirements for BER are met when E tags are reflecting simultaneously, assuming each tag is using a different code
6. All the tags are reflecting at a similar power level Examining a 3-bit tag system with 8 unique spreading codes with a processing gain large enough to have an acceptable BER when simultaneously using all 8 spreading codes, one can analyze the following scenarios:

Scenario 1: 8 3-bit tags, each with a unique spreading code and unique data.

Given the above assumptions, it can be concluded that all tags will be read simultaneously in the first round. Unique data is assumed (e.g., Tag 0 Data=000, Tag 1 Data=001, Tag 2 Data=010, . . . , Tag 7 Data=111) because otherwise, handles are required.

Scenario 2: 8 groups of 8 3-bit tags with each group using a unique spreading code and each tag within each group containing unique data.

In this scenario, the 8 groups contain the tags listed in Table 2 of FIG. 9 in accordance with an embodiment of the present invention. Referring to FIG. 9, assuming the tags in Group 0 use Spreading Code 0, the tags in Group 1 are using Spreading Code 1, and so on, it can be seen that after the tags reflect their first bit, the result will be indeterminate since half of the tags are reflecting a "0" and half are reflecting a "1."

Interrogator 102 transmits an all-zero check vector as shown in FIG. 8A and all tags with a "1" first bit (Tags 4-7 in each group) enter their no-transmit state until the new round begins.

The second bit of half of the remaining tags is a "0" and the second bit of the other half is a "1." As such, the result will again be indeterminate, and interrogator 102 will transmit another all-zero check bit as shown in FIG. 8B.

Again, the remaining tags that have a "1" as their second bit (Tags 2 and 3 in each group) enter no-transmit mode, and the system continues to the next bit.

Again, the last 2 tags in each group, Tag 0 and Tag 1, have a bit disagreement so interrogator 102 assumes the bit to be a "0" and sends another all-zero check vector as shown in FIG. 8C.

Tag 0 of each group is now read and shuts off. The new round can now begin and Tags 1-7 re-enter transmit mode.

In the first bit of the second round, four tags are reflecting a "1" and three tags are reflecting a "0." Assuming a 50% threshold, interrogator 102 will see this first bit as a "1" as shown in FIG. 8D.

At this point, Tags 1-3 enter no-transmit mode and Tags 4-7 reflect their next bit. Tags 4 and 5 are reflecting a "0" and Tags 6 and 7 are reflecting a "1" so interrogator 102 interprets this bit as a "0" as shown in FIG. 8E.

At this point, Tags 6 and 7 enter no-transmit mode and Tags 4 and 5 reflect their next bit which again results in an indeterminate bit and interrogator 102 transmits an all-zero check vector, thus indicating that Tag 4 has been read correctly and can be shut off and Tag 5 waits for the next round to begin as shown in FIG. 8F.

The first bit of round three has an equal number of reflected "1"s and "0"s so Tags 5-7 enter no-transmit mode, the second bit has a majority of "1"s so Tag 1 enters no-transmit mode, and the third bit is indeterminate so Tag 3 enters no-transmit mode, and Tag 2 is read successfully so it shuts off. In round four, the first bit has a majority of "1"s so Tags 1 and 3 enter no-transmit mode, the second bit has a majority of "1"s so Tag 5 enters no-transmit mode, and the third bit is indeterminate, so Tag 7 enters no-transmit and Tag 6 is read successfully and shuts off as shown in FIG. 8G.

In round 5, the first bit is indeterminate so Tags 5 and 7 enter no-transmit mode, the second bit is indeterminate, so Tag 3 enters no-transmit mode. Tag 1 is the only reflection contributing to the third bit and is read successfully and therefore shut off.

In round 6, the first bit is determined to be a "1" so Tag 3 enters no-transmit mode, the second bit is indeterminate so Tag 7 enters no-transmit mode, and Tag 5 is the only tag contributing to the third bit and is read successfully and shut off as shown in FIG. 8H.

In round 7, the first bit is indeterminate, so Tag 7 enters no-transmit mode and Tag 3 is the only tag contributing to the second and third bit and is read successfully and therefore shuts off. In round 8, Tag 7 is the only tag in the system and is therefore read successfully and shuts off as shown in FIG. 8I.

At this point, all 64 tags have been read successfully with 8 tags being read simultaneously in each round.

Of course, this system is limited by the constraint that all tags using the same spreading code have unique data. This constraint is removed by the use of handles, just as in Slotted ALOHA systems to detect multiple tags that contain the same data. Handles can be integrated into this system by having tags that, upon completion of a successful reading, reflect their handles between rounds. Unlike ALOHA, this handle usage does not stop a tag from reflecting its data if a collision has occurred. It only has tags that transmit its handle after the completion of transmission thus allowing the reading to still occur. Example 2 also highlights B-CDMA's ability to use shorter handles than would be necessary in an ALOHA system. Using the tag data from the example, each tag with data [000] would need a unique handle, each tag with data [001] would need a unique handle, etc. in a Slotted ALOHA system. Due to the use of the spreading codes, B-CDMA does not require handles for the given example. The required length of the handles in B-CDMA systems is therefore shorter than the required length of the handles in Slotted ALOHA systems.

By the present invention solving the near-far problem, passive CDMA-based RFID systems can have a longer read range, decreased power output from the reader and/or greater robustness in the presence of ambient noise.

The protocol of the present invention allows for automated handling of the near-far problem in passive communication without the requirement of user transmission/reflection power adjustment, allows for simultaneous reception of data from multiple users, and increases the communication system's robustness in the presence of ambient noise. This protocol allows for the maximum number of possible simultaneous user transmissions and automatically generates the number of necessary rounds to complete communication with all users on-the-fly. As such, an incremental increase in users does not necessarily cause an increase in the amount of time to complete communication with all the users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for enabling early collision detection and handling in Code Division Multiple Access (CDMA)-based radio-frequency identification (RFID) systems, the method comprising:
   receiving an instruction to reflect either a single encoded bit or multiple encoded bits of tag data;
   reflecting either said single encoded bit or said multiple encoded bits to a reader, wherein said reader decodes said single encoded bit or said multiple encoded bits, wherein said decoded bit or bits are placed in a vector or a matrix by said reader;
   receiving said vector or said matrix
   determining if said reflected bit or bits agree with a corresponding bit or bits in said vector or said matrix thereby indicating whether said reflected bit or bits were read successfully by said reader; and
   entering a no reflection mode in response to a disagreement between said reflected bit or bits with the corresponding bit or bits in said vector or said matrix.

2. The method as recited in claim 1 further comprising:
   reflecting a subsequent encoded bit or multiple encoded bits in response to an agreement between said reflected bit or bits with the corresponding bit or bits in said vector or said matrix.

3. The method as recited in claim 1 further comprising:
   redundantizing each bit of said tag data to match that of a processing gain of a spreading code.

4. The method as recited in claim 3 further comprising:
   performing a Boolean operation with said each bit of redundantized tag data and said spreading code.

5. The method as recited in claim 1 further comprising:
   shutting off a tag in response to having all of its bits of data read successfully by said reader.

6. A computer program product for enabling early collision detection and handling in Code Division Multiple Access (CDMA)-based radio-frequency identification (RFID) systems, the computer program product comprising a computer readable storage medium having program code embodied therewith, the program code comprising the programming instructions for:
   receiving an instruction to reflect either a single encoded bit or multiple encoded bits of tag data;
   reflecting either said single encoded bit or said multiple encoded bits to a reader, wherein said reader decodes said single encoded bit or said multiple encoded bits, wherein said decoded bit or bits are placed in a vector or a matrix by said reader;
   receiving said vector or said matrix;
   determining if said reflected bit or bits agree with a corresponding bit or bits in said vector or said matrix thereby indicating whether said reflected bit or bits were read successfully by said reader; and
   entering a no reflection mode in response to a disagreement between said reflected bit or bits with the corresponding bit or bits in said vector or said matrix.

7. The computer program product as recited in claim 6, wherein the program code further comprises the programming instructions for:
   reflecting a subsequent encoded bit or multiple encoded bits in response to an agreement between said reflected bit or bits with the corresponding bit or bits in said vector or said matrix.

8. The computer program product as recited in claim 6, wherein the program code further comprises the programming instructions for:
  redundantizing each bit of said tag data to match that of a processing gain of a spreading code.

9. The computer program product as recited in claim 8, wherein the program code further comprises the programming instructions for:
  performing a Boolean operation with said each bit of redundantized tag data and said spreading code.

10. The computer program product as recited in claim 6, wherein the program code further comprises the programming instructions for:
  shutting off a tag in response to having all of its bits of data read successfully by said reader.

11. A radio-frequency identification (RFID) tag, comprising:
  a memory for storing a computer program for enabling early collision detection and handling in Code Division Multiple Access (CDMA)-based RFID systems; and
  a processor connected to said memory, wherein said processor is configured to execute the program instructions of the computer program comprising:
    receiving an instruction to reflect either a single encoded bit or multiple encoded bits of tag data;
    reflecting either said single encoded bit or said multiple encoded bits to a reader, wherein said reader decodes said single encoded bit or said multiple encoded bits, wherein said decoded bit or bits are placed in a vector or a matrix by said reader;
    receiving said vector or said matrix;
    determining if said reflected bit or bits agree with a corresponding bit or bits in said vector or said matrix thereby indicating whether said reflected bit or bits were read successfully by said reader; and
    entering a no reflection mode in response to a disagreement between said reflected bit or bits with the corresponding bit or bits in said vector or said matrix.

12. The RFID tag as recited in claim 11, wherein the program instructions of the computer program further comprise:
  reflecting a subsequent encoded bit or multiple encoded bits in response to an agreement between said reflected bit or bits with the corresponding bit or bits in said vector or said matrix.

13. The RFID tag as recited in claim 11, wherein the program instructions of the computer program further comprise:
  redundantizing each bit of said tag data to match that of a processing gain of a spreading code.

14. The RFID tag as recited in claim 13, wherein the program instructions of the computer program further comprise:
  performing a Boolean operation with said each bit of redundantized tag data and said spreading code.

15. The RFID tag as recited in claim 11, wherein the program instructions of the computer program further comprise:
  shutting off a tag in response to having all of its bits of data read successfully by said reader.

16. A method for enabling early collision detection and handling in Code Division Multiple Access (CDMA)-based radio-frequency identification (RFID) systems, the method comprising:
  receiving a reflected single encoded bit or a reflected multiple encoded bits from a tag;
  decoding said single encoded bit or said multiple encoded bits'
  placing said decoded bit or bits in a vector or a matrix; and
  transmitting said vector or said matrix to said tag, wherein said tag determines if said reflected bit or bits agree with a corresponding bit or bits in said vector or said matrix thereby indicating whether said reflected bit or bits were read successfully, wherein said tag enters a no reflection mode in response to a disagreement between said reflected bit or bits with the corresponding bit or bits in said vector or said matrix.

17. The method as recited in claim 16, wherein a binary value of 1 is placed in said vector or said matrix in response to said decoding indicating a strong 1, wherein a binary value of 0 is placed in said vector or said matrix in response to said decoding indicating a strong 0, wherein a binary value of 0 or 1 is placed in said vector or said matrix in response to said decoding indicating an intermediate.

18. A computer program product for enabling early collision detection and handling in Code Division Multiple Access (CDMA)-based radio-frequency identification (RFID) systems, the computer program product comprising a computer readable storage medium having program code embodied therewith, the program code comprising the programming instructions for:
  receiving a reflected single encoded bit or a reflected multiple encoded bits from a tag;
  decoding said single encoded bit or said multiple encoded bits;
  placing said decoded bit or bits in a vector or a matrix; and
  transmitting said vector or said matrix to said tag, wherein said tag determines if said reflected bit or bits agree with a corresponding bit or bits in said vector or said matrix thereby indicating whether said reflected bit or bits were read successfully, wherein said tag enters a no reflection mode in response to a disagreement between said reflected bit or bits with the corresponding bit or bits in said vector or said matrix.

19. The computer program product as recited in claim 18, wherein a binary value of 1 is placed in said vector or said matrix in response to said decoding indicating a strong 1, wherein a binary value of 0 is placed in said vector or said matrix in response to said decoding indicating a strong 0, wherein a binary value of 0 or 1 is placed in said vector or said matrix in response to said decoding indicating an intermediate.

20. A reader, comprising:
  a memory for storing a computer program for enabling early collision detection and handling in Code Division Multiple Access (CDMA)-based radio-frequency identification (RFID) systems; and
  a processor connected to said memory, wherein said processor is configured to execute the program instructions of the computer program comprising:
    receiving a reflected single encoded bit or a reflected multiple encoded bits from a tag;
    decoding said single encoded bit or said multiple encoded bits;
    placing said decoded bit or bits in a vector or a matrix; and
    transmitting said vector or said matrix to said tag, wherein said tag determines if said reflected bit or bits agree with a corresponding bit or bits in said vector or said matrix thereby indicating whether said reflected bit or bits were read successfully, wherein said tag enters a no reflection mode in response to a disagreement between said reflected bit or bits with the corresponding bit or bits in said vector or said matrix.

21. The reader as recited in claim 20, wherein a binary value of 1 is placed in said vector or said matrix in response to said decoding indicating a strong 1, wherein a binary value of 0 is placed in said vector or said matrix in response to said decoding indicating a strong 0, wherein a binary value of 0 or 1 is placed in said vector or said matrix in response to said decoding indicating an intermediate.

* * * * *